United States Patent [19]

Kinjo et al.

[11] Patent Number: 4,491,941
[45] Date of Patent: Jan. 1, 1985

[54] REPRODUCING STYLUS FOR AN INFORMATION SIGNAL RECORDING MEDIUM

[75] Inventors: Hisao Kinjo; Keiji Ozawa, both of Yokohama, Japan

[73] Assignee: Victor Company of Japan, Ltd., Kanagawa, Japan

[21] Appl. No.: 284,933

[22] Filed: Jul. 20, 1981

Related U.S. Application Data

[63] Continuation-in-part of Ser. No. 785,095, Apr. 6, 1977, Pat. No. 4,331,976.

[30] Foreign Application Priority Data

Apr. 8, 1976 [JP] Japan .................. 51-38809
Oct. 26, 1976 [JP] Japan .................. 51-127767

[51] Int. Cl.³ .................. G11B 9/06; G11B 3/44
[52] U.S. Cl. .................. 369/126; 369/173
[58] Field of Search .................. 369/43, 126, 173, 130; 358/342

[56] References Cited

U.S. PATENT DOCUMENTS

| 1,914,659 | 6/1933 | Olsen | 369/173 |
| 3,872,241 | 3/1975 | Adler et al. | |
| 3,909,517 | 9/1975 | Clemers | 369/126 |
| 3,930,117 | 12/1975 | Clemers et al. | 369/126 |
| 4,031,546 | 6/1977 | Leedom | 369/126 |
| 4,124,867 | 11/1978 | Fuhrer et al. | 369/126 |
| 4,162,510 | 7/1979 | Keizer | 369/126 |
| 4,199,782 | 4/1980 | Wada et al. | 369/126 |
| 4,273,967 | 6/1981 | Wada et al. | 369/126 |

FOREIGN PATENT DOCUMENTS

| 923668 | 7/1947 | France | 369/173 |
| 1410015 | 10/1975 | United Kingdom | 369/126 |

Primary Examiner—Raymond F. Cardillo, Jr.
Attorney, Agent, or Firm—Louis Bernat

[57] ABSTRACT

A reproducing stylus traces a track of a recording medium, in which track an information signal is recorded as variations of geometrical shape, and reproduces as variations in capacitance the information signal thus recorded. The reproducing stylus comprises a reproducing stylus main structure having a tip portion with a sliding contact face for slidingly contacting at least one track of the recording medium, and an electrode disposed on the reproducing stylus main structure to trace one track and reproduce the information signal as the variations in capacitance in accordance with the variations in geometrical shape. The electrode has an end edge and side edges. The side edges are substantially parallel at least in the vicinity of the tip portion of the reproducing stylus main structure. The sliding contact face has a leading part and a trailing part respectively at the foremost end and the rearmost end in a relative sliding direction of the sliding contact face on the recording medium. The end edge of the electrode is at said trailing part, the length l of the sliding contact face in the relative sliding direction being larger than the width d of the end edge of the electrode in a direction perpendicular to the relative sliding direction.

4 Claims, 9 Drawing Figures

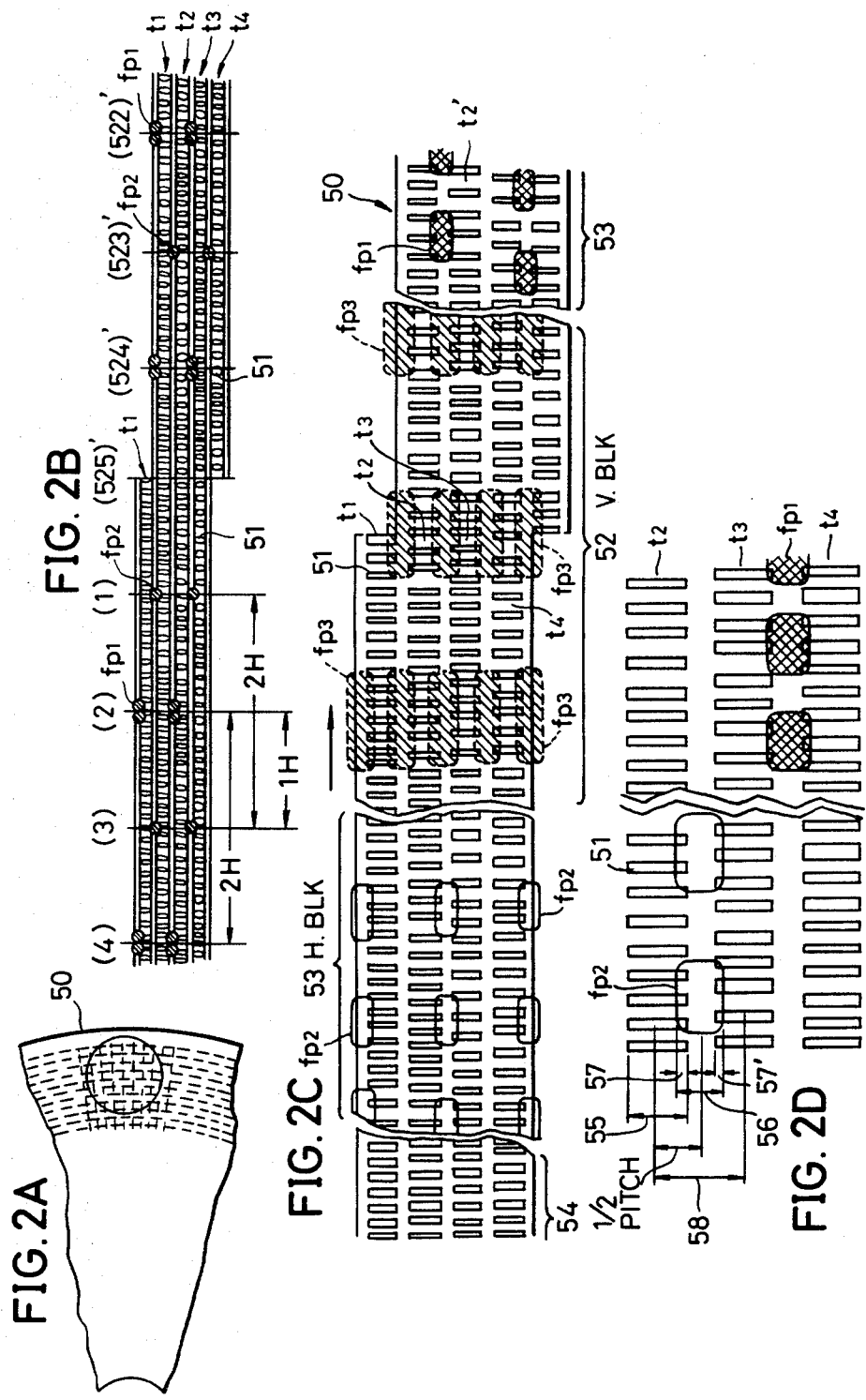

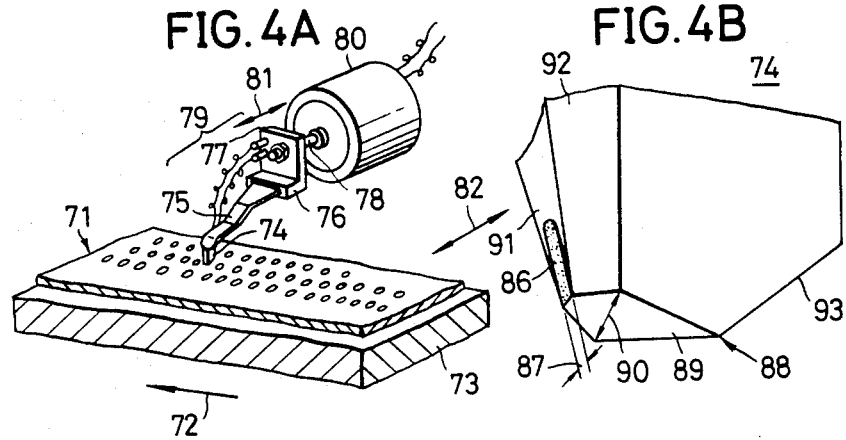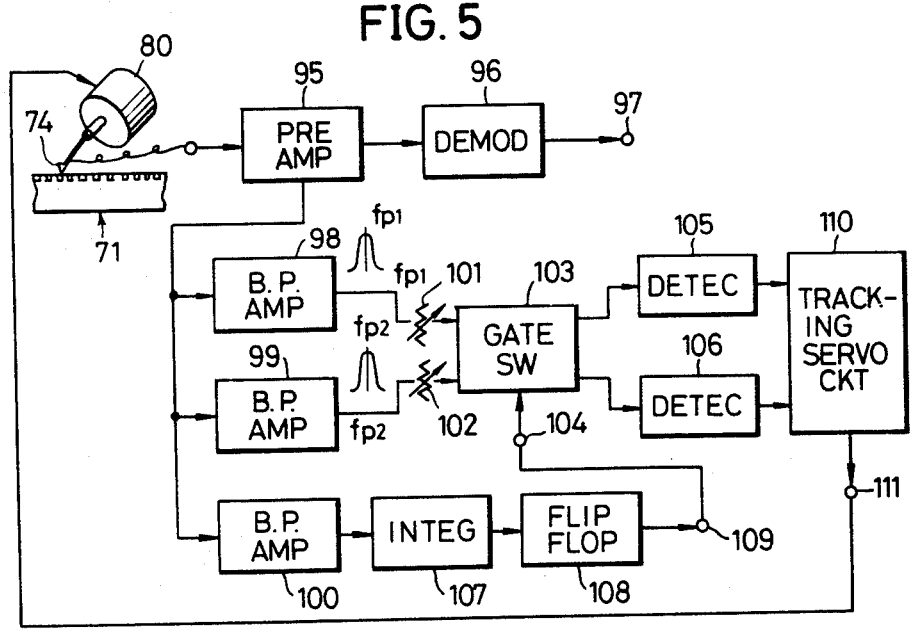

REPRODUCING STYLUS FOR AN INFORMATION SIGNAL RECORDING MEDIUM

This application is a Continuation-In-Part Application of the U.S. patent application Ser. No. 785,095 filed on Apr. 6, 1977, (now U.S. Pat. No. 4,331,976, issued May 25, 1982).

BACKGROUND OF THE INVENTION

The present invention generally relates to reproducing styluses for information signal recording mediums, and more particularly to a reproducing stylus which scans over tracks in a recording medium on which information signals are recorded as variations of geometrical configuration, to reproduce the recorded information signals as variations in electrostatic capacitance, and has a configuration which enables the reproducing stylus to have a long life.

As one example of a system which performs high-density recording and reproduction of information signals such as a video and/or an audio signal to and from a recording medium such as rotary recording medium, there is a system which records and reproduces the information signals as variations in electrostatic capacitance. A rotary recording medium reproduced by this system has a spiral guide groove formed thereon, for guiding a tracing stylus used for reproducing a signal. Along the bottom part of this guide groove, there is formed a track of an information signal which is recorded as a variation of a geometrical configuration. The tracing stylus is guided by this guide groove while tracing the bottom thereof, and thus reproduces the recorded information signal.

On the other hand, the present inventors have made it possible to record and reproduce signals in a system which does not have a guide groove, by providing a system which can perform tracking control of the tracing stylus so that the stylus will trace accurately and positively over the recorded track. In this system, the information signal is recorded on a rotary recording medium as a variation of a geometrical configuration.

However, in the above described system and the system developed by the present inventors, the recording medium must be rotated at a high speed to obtain a high relative linear velocity between the recording medium and the reproducing stylus, in order to perform reproduction with a large signal-to-noise (S/N) ratio. Hence, the reproducing stylus which makes contact with and slides over the recording medium, is easily worn out due to friction. Accordingly, from the practical point of view, a reproducing stylus which does not wear out due to friction even when the stylus is used for a long time, is desired. Further, it is desirable that the reproducing function of the reproducing stylus is not deteriorated even when the stylus is slightly worn out, and that the reproducing stylus does not damage the recording medium.

SUMMARY OF THE INVENTION

Accordingly, a general object of the present invention is to provide a novel and useful reproducing stylus for an information signal recording medium in which the above described requirements have been satisfied.

Another and more specific object of the present invention is to provide a reproducing stylus for an information signal recording medium, having an electrode surface divided by a pair of side surfaces in the vicinity of the tip end part of the reproducing stylus. According to the reproducing stylus of the present invention, the width of the electrode surface does not rapidly increase even when the tip of the reproducing stylus slightly wears out, and fine reproducing function is maintained.

Still another object of the present invention is to provide a reproducing stylus for an information signal recording medium, in which the length of a surface of the reproducing stylus at the tip end thereof which slides against the recording medium, along the relative sliding direction, is larger than the width of the surface of the reproducing stylus along a direction perpendicular to the sliding direction. According to the reproducing stylus of the present invention, the wear of the reproducing stylus due to friction is small and the stylus can be used for a long time, since the area of the sliding surface of the reproducing stylus which slides against the recording medium can be made large.

Another object of the present invention is to provide a reproducing stylus for an information signal recording medium, in which the tip end part of the surface of the reproducing stylus which slides against the recording medium along the relative scanning direction has an vertex of an acute angle. According to the reproducing stylus of the present invention, fine reproduction can be performed since the vertex having an acute angle of the reproducing stylus slides against the reproducing stylus, and dust particles, unwanted particles and the like are removed by the vertex of the above surface of the reproducing stylus which slides against the recording medium. Moreover, skipping of the reproducing stylus is hardly introduced.

Still another object of the present invention is to provide a reproducing stylus for an information signal recording medium, having a configuration in which an edge part extends obliquely towards the upward direction from the vertex of the surface which slides against the recording medium. According to the reproducing stylus of the present invention, the process to manufacture the reproducing stylus of the above configuration is facilitated.

Further objects and features of the present invention will be apparent from the following detailed description when read in conjunction with the accompanying drawings.

BRIEF DESCRIPTION OF THE DRAWINGS

FIGS. 2A through 2D are successively enlarged views respectively showing a portion of an example of a track pattern formed on a rotary recording medium which is reproduced by a reproducing stylus according to the present invention;

FIGS. 4A and 4B are perspectively a view showing one example of reproducing tracing means, and an enlarged perspective view, as viewed from the bottom, showing a tip end portion of a reproducing stylus according to the present invention; and FIG. 5 is a systematic block diagram showing an example of a reproducing system for reproducing a recording medium.

DETAILED DESCRIPTION

Figure 1:
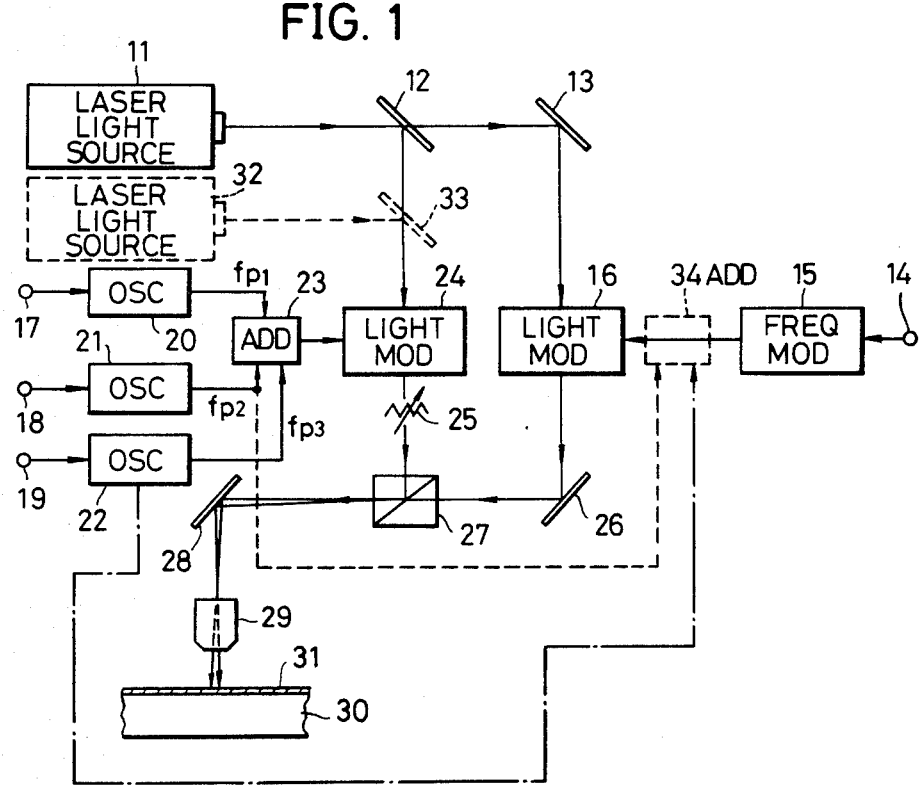
FIG. 1 is a systematic block diagram showing an example of a recording system for recording information signals on a recording medium which is reproduced by use of a reproducing stylus.

An example of a recording system for recording information signals on a recording medium is first described in conjunction with FIG. 1.

Referring to FIG. 1, a part of a laser beam projected from a laser light source 11 is reflected, by a half-mirror 12, to a light beam modulator 24. The remaining part of the projected laser beam passes through the half-mirror 12 and is reflected by a reflecting mirror 13 to a light beam modulator 16. A recording information signal including a color video signal and an audio signal is introduced through an input terminal 14 and is supplied to a frequency modulator 15 where it frequency-modulates a carrier. The output frequency modulated signal is applied to the light beam modulator 16 where it modulates the laser beam. A first modulated light beam, which has been modulated by the frequency modulated signal at the light beam modulator 16, is reflected by a reflecting mirror 26 to be formed in a light beam of which section is elliptic. This light beam passes through a polarization prism 27. The resulting light beam is reflected by a reflecting mirror 28 and projected into an objective lens 29. The light beam passed through the lens 29 is focused in such a manner that a focal point of the lens 29 coincides with a sensitive material 31 coated on an original recording disc 30 made of material such as glass.

Switching pulses are applied to oscillators 20, 21 and 22 through input terminals 17, 18, and 19, respectively. The switching pulses cause, for instance, the oscillators 20, 21 and 22 to have an output during the interval of positive pulse polarity, and to have no output during the interval of negative pulse polarity. The oscillators 20, 21, and 22 oscillate at their original frequencies and generate signals having, respectively, single frequencies fp1 (e.g., 700 KHz), fp2 (e.g., 500 KHz), and fp3 (e.g., 300 KHz).

When every two-frame video signal is to be recorded on the disc 30 per rotation thereof, for instance, first and second pulses are used alternatively during every two-frame interval. These are input switching pulses which are supplied to the input terminals 17 and 18. The pulse width is selected so that a reference signal for tracking control which is modulated by the above first and second pulses does not affect a color burst signal. Consequently, the signal fp1 is produced for a two-frame interval (1/15 second) from the oscillator 20, in synchronism with the horizontal synchronizing signal. Following this, the signal fp2 is produced from the oscillator 21 for the following two-frame interval, in synchronism with the horizontal synchronizing signal. The signals fp1 and fp2 are thereafter produced every two-frame period, successively and alternately.

In correspondence to the time point when the signals fp1 and fp2 switch, a third reference signal fp3 is sent out from oscillator 22. This signal fp3 is an index pulse at the time of reproduction.

The invention may be used to carry out a special reproduction such as still-motion or slow-motion. It is particularly useful if the information signal is principally a video signal. A kick-back control is required for shifting or forcibly transferring a reproducing tracing means tracing one track, to another track within a vertical blanking period (abbreviated as V.BLK hereinafter). For this kick-back control operation, the signal fp3 is recorded at the V.BLK part of the video signal. The pulses may be recorded as the signal fp3 during two or three H periods at the initial horizontal synchronizing pulse part following equalizing pulses, projecting toward the white side. However, when the tracing stylus is actually kicked back by the signal fp3, at the time of still-motion reproduction or slow motion reproduction, the tracing stylus is not stabilized on a predetermined track immediately after jumption. Rather, the tracing stylus hunts to some extent. Interrelatedly with a response characteristic of the mechanism for moving the tracing stylus, some noise may appear on the upper part of the picture responsive to the kick-back operation.

Therefore, in order to kick back completely within the V.BLK interval, the switching operation is carried out at the time of signal recording and reproduction either just before or just after of the respective ends of the video signal intervals.

The signals fp1, fp2, and fp3 are composed at the adder 23, and applied as a modulation signal, to the light beam modulator 24. The second modulated output light beam from the light beam modulator 24 is attenuated by a light filter 25. The brightness (beam light quantity) is adjusted to be attenuated appropriately in comparison with the quantity of light of the first modulated light beam. The attenuated second modulated light beam thereafter advances to a polarization prism 27, where the polarization plane of the light beam is deviated by 90° with respect to the polarization plane of the first modulated light beam.

The second modulated light beam which has passed through the polarization prism 27, together with the first modulated light beam, is reflected by the reflecting mirror 28 and passes through the objective lens 24. Then the beams irradiate the sensitive material 31 on the rotating recording disc 30. The polarization prism 27 adjusts the incident light path of the second modulated light beam toward the objective lens 29, with respect to the first modulated light beam.

The exposure of the light beams by the above described optical system on the sensitive material of the rotating recording disc 30 is performed in the radial direction thereof by a predetermined pitch. After this exposure, developing process is performed, whereby the spiral track, for instance, is formed as a change of the geometrical configuration such as pits in accordance with the exposure. Pits are not formed directly by only exposure of the light beam on the light sensitive material 31. As a result of the above described adjustment, the second modulated light beam records and forms a sub-track, which is separated by approximately a ½ track pitch from a main track formed by the first modulated light beam. Here, the track pitch refers to a distance between two tracing center lines of adjacent tracks.

Moreover, it may not be appropriate to divide the beam into two beams by the half-mirror 12. For example, the beam power of the laser light source 11 may be too low. If so, another laser light source 32 (indicated by a dotted line in FIG. 1) may be additionally provided. In this case, the light beam intensity, the modulation index and the like, of the beam projected from the laser light source 32 are appropriately adjusted with respect to the first modulated light beam.

The light beam projected from the laser light source 32 is reflected by a reflecting mirror 33 and is then supplied to the light beam modulator 24. Moreover, interrelatedly with the provision of the laser light source 32, the half-mirror 12 is omitted and the light beam projected from the laser light source 11 is supplied to only the light beam modulator 16.

If the main recording information signal is a color video signal, the reference signals may be obtained by frequency dividing a chrominance sub-carrier of the color video signal.

Further, instead of recording with a light beam, the recording is by a double electron beam.

Accordingly, a track pattern recorded on the disc by the system in FIG. 1 is as indicated in FIG. 2A through FIG. 2D, for instance. The signals fp1, fp2, and fp3 are recorded in alignment in the radial direction of the disc 50. FIG. 2B schematically shows an example of a track pattern which circles the disc indicated in FIG. 2A, for convenience of description. A track pattern indicated in FIG. 2C is a magnification of part of the track pattern in FIG. 2B. In FIG. 2B, numerals (1), (2), (3), . . . respectively indicate parts where the first, the second, the third . . . horizontal synchronizing signals of the first frame of the video signal are recorded Numerals (521)', (522)', . . . (525)' respectively indicate parts where the 521st, the 522nd, . . . the 525th horizontal synchronizing signals of the second frame of the video signal are recorded. That is, in the present example, two frames of the video signal having 525 horizontal scanning lines per one frame are recorded for every rotation of the disc.

In FIG. 2c, reference marks t1, t2, t3, . . . respectively designate the first, the second, the third . . . main tracks which are recorded and formed, one track during every rotation of the disc 50. The recording is made by forming a number of intermittent pits 50. The reference signals fp1 and fp2 are recorded alternately with a period of one rotation between them. The reference signals are formed by intermittent pits located between the adjacent main tracks. The pits are shallow in comparison with the depth of the pits of the main track. Further, although the illustration is omitted in FIG. 2B for the sake of simplification, the reference signal fp3 is recorded as timing pulse at a position 52 where the recording of the signal fp1 and fp2 is switched as indicated by a broken line in FIG. 2c. The switched position corresponds to a position (525)' in FIG. 2B.

If the main information signal comprises at least the video signal, a recording of the reference signals is effected similar to the recording in the preceding description. That is, in order to prevent the beat disturbance of cross modulation between the reference signals and the video signal, the signals fp1 and fp2 are recorded within a H.BLK interval, as indicated by the numeral 53 in FIG. 2c. The signal fp3 is recorded at a V.BLK part 52. Therefore, none of the signals fp1, fp2, and fp3 is recorded in the video information period 54.

Further, to record and reproduce the signals fp1 and fp2 with higher sensitivity, the present embodiment is arranged so that the positions of the signals fp1 and fp2 are respectively alternately recorded separately along every track. These signals are located at positions in the H.BLK period with a period of 2H interval. Furthermore, the recording of the signals fp1 and fp2 is such that the recording positions of the signals fp1 and fp2 are located within the H.BLK period at positions which are separated or deviated by every 1H interval alternately with respect to the adjacent tracks. According to this arrangement, the signals fp1 and fp2 are recorded without affecting the main information signal. Further, the reference signals can be recorded with a wider dimension even when the main information signal is recorded with very small track pitch, i.e., with high density. The reference signals can be reproduced in a stable manner, thereby stabilizing the tracking control operation. However, the signals fp1 and fp2 may be recorded at positions corresponding to every H.BLK of the video signal. Further, by using a single low frequency, the reference signal can be reproduced in a stable manner. This low frequency has a longer wavelength as compared to the reference signals described hereinbefore.

FIG. 2D indicates a part of the track pattern indicated in FIG. 2B, with further enlargement. The track pattern is formed by recording a main track with track pitch 58 (e.g., 2.8 μm), pit width 55 (e.g., 2.6 μm), and a sub-track with pit width 56 (e.g., 1.2 μm) at an intermediate position between the adjacent main tracks, with overlap on the main track at parts 57, 57'.

Figure 3:
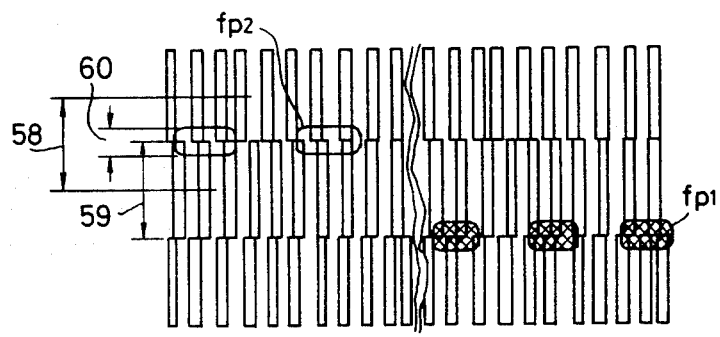
FIG. 3 is an enlarged view showing another example of a track pattern formed on a recording medium which is reproduced by a reproducing stylus according to the present invention.

FIG. 3 is an enlarged plan view showing a part of a track pattern of a second embodiment. The track pattern is formed by recording the main track with a track pitch 58 of 2.8 μm, which is the same as that of the main tracks in FIG. 4D. The track pitch coincides with the pit width 59 without any vacant space between the adjacent main tracks. Also the sub-track is recorded with a pit width 60 of 1.0 μm, for instance, at the intermediate part between the center lines of adjacent main tracks so as to entirely overlap on the main track. The track pattern set forth is more effective for increasing or improving the signal reproducing sensitivity and the recording density of the information track.

Furthermore, the signals fp1 and fp2 may be recorded with pits of a size which will not overlap with respect to the main information pit pattern. However, as shown in FIGS. 2B, 2C, 2D, it is desirable for the information pits of the main information signal and the pits of the signals fp1 and fp2 to be formed at the intermediate parts of the main information signal pits. Moreover, the pits of fp1 and fp2 partially overlap parts with respect to the pits on both of their sides. Even when recording is carried out in this manner, the above mentioned reference signal has no electerious effect whatsoever on the main information signal, particularly as long as the reference is within the horizontal blanking period.

In this case, since the reference signal recording track has a greater width, the stabilization of the tracking control operation becomes better. However, for accomplishing an excellent reproduction of the main information signal, it is desirable that only one of the signals fp1 and fp2 be recorded in the corresponding parts of the horizontal blanking period of the main information signal recording track. This can be done by recording the signals fp1 and fp2 intermittently with periods 2H, 3H, ... etc., for example.

As is known, if the main information signal is an audio signal, there is no periodic signal such as a horizontal synchronizing pulse in the audio signal. However, by recording the reference signals fp1 and fp2 with different phases, respectively front and rear, in the rotational direction at the opposite lateral side parts of the audio signal track, tracking control can be accomplished even more advantageously than in the above described case. The reference signal recording position is limited to the part corresponding to the horizontal blanking period.

As is also known in this connection, the horizontal scanning frequency of a television video signal of the NTSC system is 15.75 KHz. Since the rotational speed of the disc 50 in this example is 900 rpm, the fundamental error period at the time of disc eccentricity is merely 15 Hz. This period is ample to provide the information tracking control.

Moreover, instead of using the signal fp3, the deficient part is detected and discriminated from the other recording part. The reproduced signals fp1 and fp2 pass through an integration circuit at the time of the reproducing mode, without recording the signals fp1 and fp2 during the 2H through 3H intervals within the V.BLK period.

FIG. 4A shows one example of a reproducing tracing means which can be applied to a reproducing stylus according to the present invention.

A disc-shaped recording medium (disc) 71 has on its surface a thin metal film coating. On this disc surface, pits of the main information signal and reference signals fp1 and fp2 are respectively recorded on opposite lateral sides, as shown in FIGS. 2 and 3. The disc 71 is positioned on and rotates with a turntable 73 rotated synchronously by a disc motor (not shown) at, for example, 900 rpm. Turning is in the arrow direction 72 at the time of reproducing. A tracing stylus 74, which is an embodiment of a reproducing stylus according to the present invention, is positioned to contact and slide over the disc 71. For example, a signal pickup may be an electrostatic capacitance type. A video signal of two frames is reproduced on every rotation of the disc 71.

The tracing stylus 74 has a tip shape as shown in FIG. 4B. The tracing stylus proper is made of a material such as diamond or sapphire. The entering or leading part 88 of this tracing stylus 74 is formed by the acute vertex of the sliding surface 89. An electrode 86 made of a metal such as titanium is secured to a back surface 91 of the stylus which becomes the electrode surface, by a sputtering process. The width 87 of the electrode corresponds substantially to the pit width, being approximately 2 $\mu$m in the present embodiment. For preserving the serviceable life of the stylus over a long period, the area of the contacting and sliding surface 89 of the stylus tip end should be made large. For this purpose, the dimensions of the contact at least in the longitudinal direction is made large. The width and area of stylus contact with the disc surface should be large relative to the information pit. Accordingly, the sliding surface 89 makes simultaneous contact with a plurality of pits at the time of contact. The electrode width 87 corresponds to the information width of a single pit. Therefore, while the contact area is amply large, pit information can be picked up in the form of variations of electrostatic capacitance. There is a high sensitivity from the electrode part 86.

The width of the back surface 91 provided with the electrode 86, in the vicinity of the tip end part of the back surface 91, is restricted by a pair of right and left side surfaces 92. The back surface 91 has an end edge defined by the sliding surface 89, and a pair of side edges defined by the side surfaces 92. These side edges of the back surface 91 diverge upwardly, as shown in FIG. 4B, from the end edge of the back surface 91, so that the width of the back surface 91 remote from the end edge thereof is larger than the width of the end edge. Due to this diverging shape of the back surface 91, the side edges of the back surface 91 are spaced away from the side edges of the electrode 86. Accordingly, even when the part of the tracing stylus 74 in the vicinity of the tip end thereof, begins to slightly wear out from the sliding surface 89 due to friction, the width 87 of the electrode 86 does not exceed the width of a single pit. Hence, the life of the tracing stylus is lengthened.

In addition, the leading part 88 which forms the tip end of the tracing stylus 74 in the relative tracing direction with respect to the disc 71, is formed as a vertex having an acute angle as described above. Therefore, dust particles on the disc 71 is swept away on both sides with respect to the tracing stylus 74, by the leading part 88. Accordingly, the dust particles are prevented from entering between the sliding surface 89 and the disc 71, and the signal-to-noise (S/N) ratio does not deteriorate. Thus, fine reproduction can be performed in which the skipping of the tracing stylus 74 is not introduced.

Further, the sliding surface 89 is of a pentagon shape, as shown in FIG. 3B. As clearly shown in FIG. 3B, the length 1 of the sliding surface 89 in a direction perpendicular to the width direction of a maximum width part 90, is larger than the width 87 of the electrode. Hence, the area of the sliding surface can be made large, by not particularly enlarging the width of the sliding surface 89, to reduce the pressure of the stylus per unit area. Accordingly, the wear of the tip end of the stylus due to friction can be made small. Thus, the life of the tracing stylus is also lengthened from this point of view.

Since and edge 93 is formed obliquely in the upward direction from the vertex of the leading part 88, the size of the main stylus body at the base end side of the stylus can be made large compared to the size of the stylus at the tip end thereof. Therefore, the process to manufacture the tip end of the stylus is facilitated. Moreover, it is easy to mount the stylus onto the cantilever.

The tracing stylus 74 is secured to a moving shaft 78 of a moving coil mechanism 80 by way of a thin leaf spring 75, a shock-absorbing member 76, and a bracket 77. The spring 75 and the shock-absorbing member 76 enable a stable contact between the sliding tip of the tracing stylus 74 and the information surface on the disc 71, with a light pressing force of approximately 30 mg. Furthermore, the light up-and-down pressing force of the tracing stylus 74 is imparted to a signal pickup part 79, which is so constructed that it does not move in the left-and-right direction. The moving coil mechanism 80 is constructed similar to a loudspeaker and comprises a permanent magnet, a driving coil, and a yoke none shown). The part is axially supported by a damper and is provided with the moving shaft 78. This moving shaft 78 is displaced in its radial direction, that is, in an arrow direction 81, which is the disc radial direction. Shaft 78 is displaced in response to the direction and magnitude of the electric current supplied to the above mentioned driving coil.

By this construction, the signal pickup structure 79 includes the tracing stylus 74 mounted on the moving shaft 78. The tracing stylus 74 is capable of high-speed control driving the tracing stylus 74 in the direction perpendicular to the signal track traced on the disc 71. Furthermore, the signal pickup structure 79 and the moving coil mechanism 80 are mounted on a traversing mechanism (not shown). They travel in a straight line and at a low speed synchronized with the rotational speed of the disc 71. Travel is in the radial direction 82 of the disc 71 at the time of signal recording or reproduction.

Next, an example of a reproducing system will be described in conjunction with FIG. 5.

In the system shown in FIG. 5, a reproduced signal picked up as a minute variation of electrostatic capacitance by the tracing stylus 74 from the disc 71 is supplied to a preamplifier 95 having a resonant circuit. The resonant frequency varies in response to this variation in electrostatic capacitance and is formed into a signal of a desired level. The resulting output of the preamplifier 95, is demodulated into the original information signal by a demodulator 96 and is sent out as an output through an output terminal 97.

The output signal of the preamplifier 95, is supplied respectively to amplifiers 98, 99, and 100. Here, each of the amplifiers 98 and 99 is a kind of band-pass amplifier. The amplifier 98 is designed to have a steep passing frequency characteristic at only the frequency fp1. The amplifier 99 is designed to have a steep passing frequency characteristic at only the frequency fp2. As a result, the signal of frequency fp1 and the signal of frequency fp2 are obtained separately from the amplifiers 98 and 99, respectively. These signals respectively pass through level adjustors 101 and 102, where their levels are adjusted. The resulting signals are then supplied to a gate switching circuit 103. These reproduced signals fp1 and fp2 are pulse trains respectively having periods corresponding to 2H (2 horizontal scanning periods). Moreover, they have a coinciding phase in the horizontal blanking period of the reproduced video signal. When this horizontal blanking period is approximately 11 microseconds, for example, and the frequencies fp1 and fp2 are set at 500 KHz and 300 KHz, respectively, the signals fp1 and fp2 become cyclic waveforms of approximately 5 cycles and 3 cycles, respectively.

A switching pulse generated in the position designated by reference numeral 52 in FIG. 2C, and is supplied through an input terminal 104 to the gate switching circuit 103. (This position is the V.BLK part if the recorded main information signal is the video signal.) This switching pulse is which switches the signals fp1 and fp2 every revolution period of the disc 71. The disc rotational speed in the present example is 900 rpm. as mentioned hereinbefore. Therefore, two frames of the video signal are recorded for each revolution of the disc 71. The switching pulse applied to the input terminal 104 has inverting polarities which change every two frames (1/15 second). As a result, the gate switching circuit 103 supplies the signals fp1 and fp2 to detecting circuits 105 and 106, respectively, for a period of two frames. In the following two frame period, the signals fp2 and fp1 are respectively supplied to the detecting circuits 105 and 106.

The band-pass amplifier 100 is designed to have a band-pass filter characteristic by which is separately filters only the signal of frequency fp3. The signal fp3 which has been separated and amplified in this band-pass amplifier 100, is supplied to an integration circuit 107. There, its wave is shaped so that it is not affected by noise and other influences. The wave-shaped signal is then applied to trigger a flip-flop 108. The resulting output of this flip-flop 108 is sent out through an output terminal 109 and applied to the aforementioned input terminal 104.

Means are provided to suppress the effects of interruption, dropouts, noise, etc., in the signal derived from the tracing stylus 74. To obtain an even more stable and accurate switching pulse from the terminal 109, it is desirable to use, before directly triggering the flip-flop 108 with the signal fp3, a means such as a flywheel oscillator, which is a free running oscillator at 15 Hz or an AFC circuit that is capable of accomplishing the same function.

The detecting circuits 105 and 106 detect the envelopes of their respective input reference signals and convert the envelopes into DC voltages. These voltages are then supplied to the input terminals of differential amplifiers (not shown) within a tracking servo circuit 110. This tracking servo circuit 110 compares the output signals of the two detecting circuits 105 and 106 which vary in response to the reproduced levels of the signals fp1 and fp2. This generates an output tracking error signal which indicates the tracking error direction and the error quantity. This error signal is further amplified to a specific level by known circuitry. Then, it is applied through an output terminal 111 to the moving coil mechanism 80 of the tracing stylus 74. Thus, the tracking of the tracing stylus 74 is stably controlled by the resulting closed loop.

In operation, the reproduction of the track t2 is to start, continuing from the recording position 52 of the signal fp3, upon completion of the reproduction of the track t1 of the tracing stylus 74, in FIG. 2B. In the instant embodiment of the invention the reference pulse signal fp3 is extracted from the signal reproduced from the track t1. With this signal fp3 as reference, the polarities of the signals fp1 and fp2 are inverted upon reproduction of the track t2. The control direction by the signals fp1 and fp2 is inverted from that at the time of reproduction of the track t1, to control the moving coil mechanism 80.

The reason for this is that the reference pulse signals fp1 and fp2 are recorded along the sides of the information track. The reference pulse signals are alternatively switched to opposite sides of each adjacent track, as is apparent from the explanation of the track pattern used in the recording system. For example, in the direction which the stylus traces along the track, the signal fp1 is formed on the right side of the track t1, while the signal fp2 is formed on the left side of the track t1; the signal fp1 is formed on the left side of the track t2, while the signal fp2 is formed on the right side of the track t2.

For this reason, at the time of reproduction of the track t2, the tracing stylus is controlled and moved toward the outer periphery of the disc 71 responsive to reproduction of the signal fp1, and then moved toward the center of the disc by the reproduction of the signal fp2. Therefore, this time, it is possible to trace accurately and positively in succession over the track t2.

The track t3 is reproduced upon completion of the tracing of the track t2, per revolution. By the inversion again of the polarities of the signals fp1 and fp2 at the recording position 52 of the signal fp3, tracing and tracking of the track t3 is similarly carried out. Similarly thereafter, the signal pickup structure 79 shown in FIG. 4A accurately and positively traces and reproduces the successive track paths, following one after another. The pickup successively moves, with a specific pitch, in the radial direction of the disc 71, for example, from the outer periphery toward the center of the disc. Thus, a normal reproduced picture is obtained.

The present invention reproduces a still motion picture by continuous reproduction of the same track and reproduces slow-motion pictures by repeated reproduction of each track. For example, upon completion of the first time reproduction of the track t1, a pulse is obtained responsive to the pulse signal fp3 which is detected from the signal recording position 52. This pulse signal has a compulsory power, with respect to the tracking servo circuit 110, and is applied from outside. A signal is applied from a tracking servo amplifier (not shown) to the moving coil mechanism 80. The tracing stylus is caused to jump or kick back at the position 52.

In this manner, a continuous tracing of only the track t1 can be effected.

Furthermore, it is also possible by reducing to ⅓ the traversing speed of the signal pickup structure 79 in the disc radial direction. The above described operation is repeated three times for reproducing each of the succeeding tracks in a desired reproduced picture, for example. Interrelatedly with this, the switching pulses of the signals fp1 and fp2 are processed so that the same track will be reproduced three times each, and a 3:1 slow-motion picture is obtained. In addition, various operations such as high-speed searching, determination of the starting point of reproducing and forward-reverse reproduction can be carried out as desired.

Further, this invention is not limited to these embodiments. Variations and modifications may be made without departing from the scope and spirit of the invention.

What is claimed is:

1. A reproducing stylus for tracing a track on a recording medium, an information signal being recorded in said track as variations of a geometrical shape, and for reproducing the recorded information signal as variations in capacitance responsive to said variations of said shape, said reproducing stylus comprising:
   a reproducing stylus main structure having a tip portion with a sliding contact face for slidingly contacting at least one track of the recording medium; and
   an electrode disposed on the reproducing stylus main structure to trace one track and reproduce the information signal as the variations in capacitance in accordance with the variations in geometrical shape,
   said electrode having an end edge and side edges, said side edges being substantially parallel at least in the vicinity of the tip portion of the reproducing stylus main structure,
   said reproducing stylus main structure having a rear surface formed on the stylus structure, said electrode being disposed on said rear surface, said rear surface having an end edge and two side edges, said side edges of the rear surface diverging upwardly from both ends of said end edge so that the side edges of the rear surface which are remote from the end edge are wider than the width of the end edge,
   said sliding contact face having a pentagonal shape with a leading part and a trailing part respectively located at the foremost end and the rearmost end in a relative sliding direction of the pentagonal sliding contact face,
   said end edge of the electrode being at said trailing part, the length of the pentagonal sliding contact face in the relative sliding direction being greater than the width of the end edge of the electrode in a direction perpendicular to the relative sliding direction.

2. A reproducing stylus as claimed in claim 1 in which said information signal recorded on the recording medium as said variations of geometrical shape is at least one row of intermittent pits, said reproducing stylus main structure further has a pair of side surfaces for defining the width of the rear surface on which said electrode is disposed at least in the vicinity of the tip portion of the reproducing stylus main structure, and the width of the electrode corresponds to the width of said row of intermittent pits.

3. A reproducing stylus as claimed in claim 1 in which said leading part being formed by an acute vertex.

4. A reproducing stylus as claimed in claim 3 in which the reproducing stylus main structure further has an edge line extending obliquely upwards from the acute vertex of the leading part.

* * * * *